No. 701,466. Patented June 3, 1902.
N. CEIPEK.
CENTRIFUGAL FILLING MACHINE.
(Application filed Dec. 6, 1900.)
(No Model.) 2 Sheets—Sheet 1.
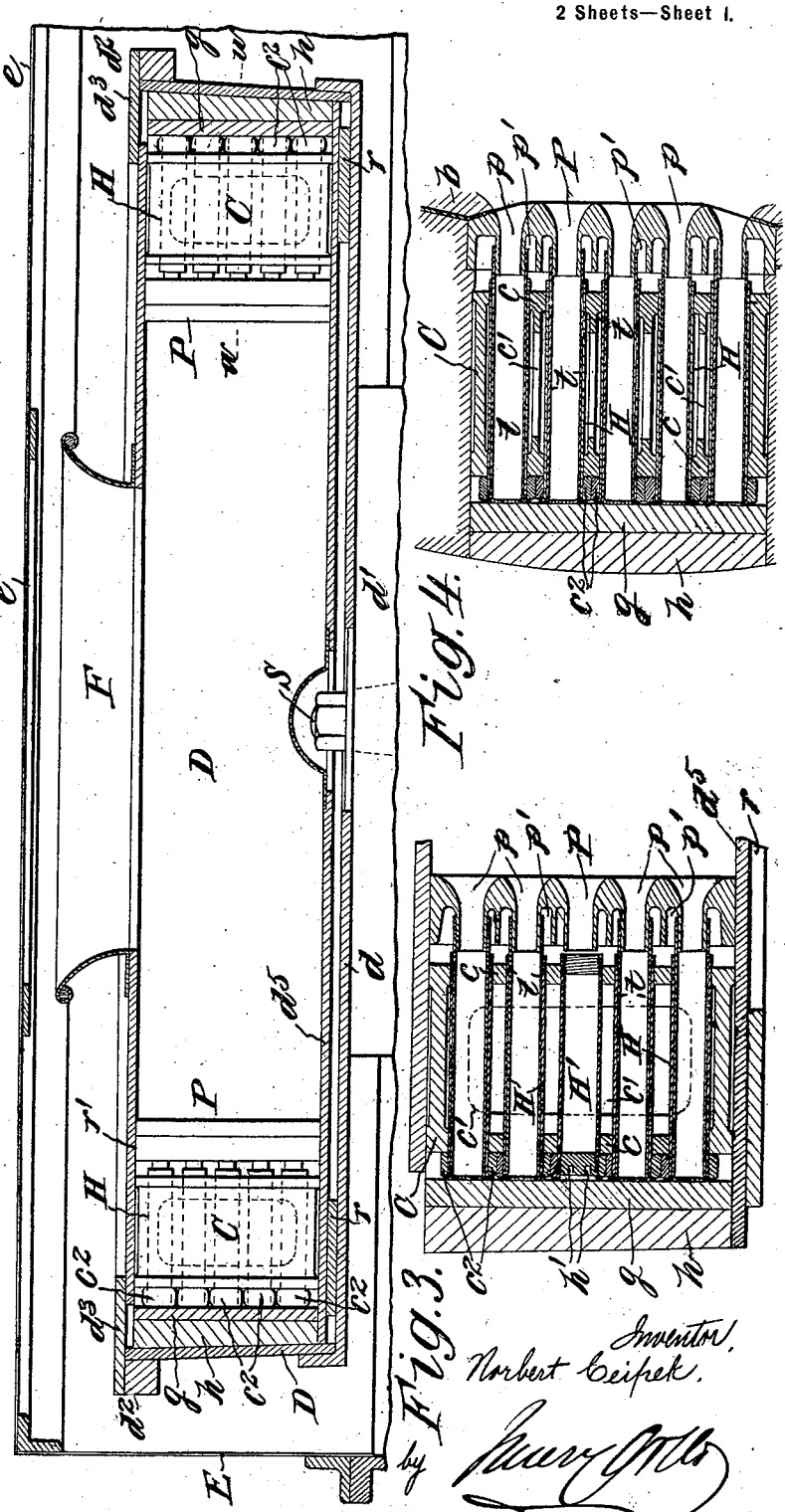

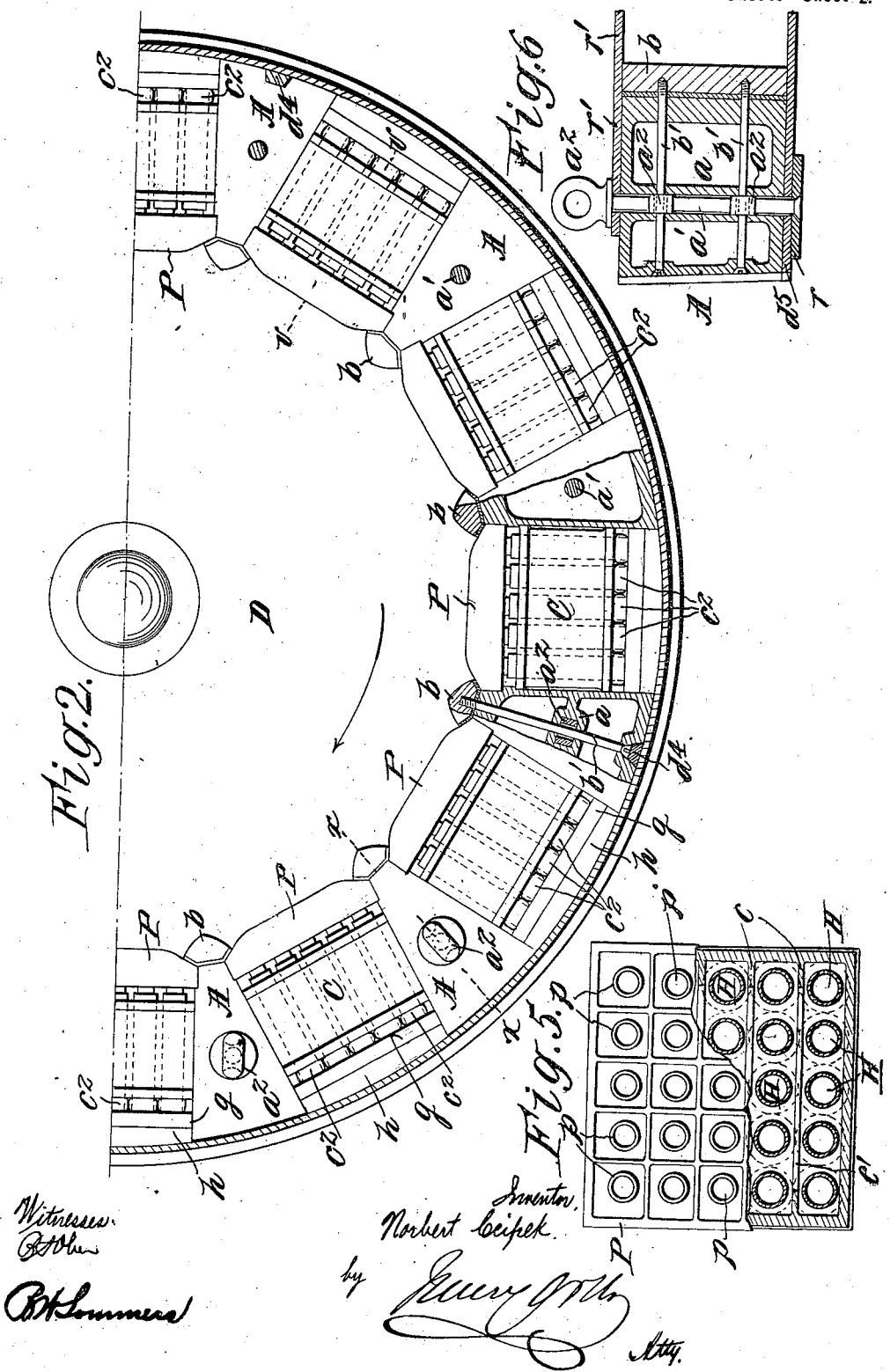

UNITED STATES PATENT OFFICE.

NORBERT CEIPEK, OF VIENNA, AUSTRIA-HUNGARY.

CENTRIFUGAL FILLING-MACHINE.

SPECIFICATION forming part of Letters Patent No. 701,466, dated June 3, 1902.

Application filed December 6, 1900. Serial No. 38,956. (No model.)

*To all whom it may concern:*

Be it known that I, NORBERT CEIPEK, a subject of the Emperor of Austria-Hungary, residing at Vienna, in the Province of Lower Austria, in the Empire of Austria-Hungary, have invented certain new and useful Improvements in Centrifugal Filling-Machines; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention has relation to multiple-tube filling-machines; and it has for its object certain features of construction whereby a large number of tubes may be filled with a granular, pulverulent, or more or less viscid substance and whereby the filled tubes can be readily removed and empty tubes substituted.

The invention has for its further object the provision of means for simultaneously rotating the tube-holders of a carrier about their axis for the purpose of severing the material in the tubes from that in the feed-funnel when a more or less viscid material is to be packed into tubes, and thereby preventing such material being drawn out into a stringy form when the filled tubes are removed with their holders; but that my invention may be fully understood I will describe the same in detail, reference being had to the accompanying drawings, in which—

Figure 1 is a vertical axial transverse section of so much of a centrifugal-tube filling-machine as will be necessary to an understanding of my invention. Fig. 2 is a half top plan view thereof, partly in section, the upper retaining-rings being removed. Fig. 3 is a vertical section taken on line $r\ r$ of Fig. 2. Fig. 4 is a horizontal section taken on line $w\ w$ of Fig. 1. Fig. 5 is an elevation, partly in section, of one of the tube-holders and showing in part the plate which carries the filling-nozzles; and Fig. 6 is a vertical section on line $x\ x$ of Fig. 2.

The centrifugal drum may be of any suitable construction. As shown in Fig. 1, it comprises the drum proper, D, its bottom plate $d$, secured to a tubular support $d'$, mounted on and rotating with the axially-disposed driving-shaft S. At its upper end the drum D is surrounded by a strengthening or bracing ring $d^2$, to which is removably bolted a lock-ring $d^3$. The drum D is provided on its inner periphery with vertical guide-ribs $d^4$, equidistant from each other.

The carriers C for the tubular tube-holders H are assembled into a ring on a circular frame adapted to be lowered into and hoisted out of the centrifugal drum D, said carriers consisting of parallelepipedal hollow bodies or carriers the inner and outer vertical walls of which have parallel rows of holes formed therein for the introduction of the tubular tube-holders H, the vertical walls $c$ between each two vertical rows of tube-holders being open or frame-like for the sake of lightness, as shown at $c'$, partly in full and partly in dotted lines, in Fig. 3, in full lines in Fig. 4, and at the lower part of Fig. 5.

The tube-holders H, into which the tubes $t$ to be filled are inserted, are of such a length as to project from both the inner and outer vertical walls of the carriers C, and each tube-holder has at its outer end a friction ring or sleeve $c^2$, of rubber, for instance, of such thickness or external diameter that all the rings will be in frictional contact with one another when the tube-holders, with the tubes $t$ to be filled inserted therein, are inserted into their bearings from without—*i. e.*, through the bearings in the outer vertical wall of the carriers C, as shown in Figs. 3 and 4.

The bearings for the tube-holders H are of such a diameter as to allow said holders to revolve freely, and one of them, preferably the central one, H', Fig. 3, not intended for the reception of a tube to be filled and closed at both ends, has in its outer end recesses or notches $h'$ for a key or crank, by means of which said tube can be rotated and therethrough all of the other tube-holders through their friction-sleeves $c^2$, for purposes presently explained.

The tubes $t$ to be filled are closed at one end and are of such a length that their open end will project some distance from the inner end of their respective tube-holders H. (See Figs. 3 and 4.)

The described tube-holder carriers C are assembled in a ring-frame, which fits snugly into the centrifugal drum D, as follows: The carriers C are seated on a disk $d^5$, which fits into the centrifugal drum D and has secured to its under side a ring $r$ of less diameter than that of the disk $d^5$, which ring rests upon the bottom $d$ of said drum. Between each two carriers is inserted a wedge or sector shaped spacing device A, hereinafter referred to as the "spacer," which is hollow for the sake of lightness, and some or all of said spacers have a vertical groove in the outer wall fitting the guide-ribs $d^4$, which not only guide the ring-frame when lowered into or hoisted out of the centrifugal drum, but also lock the same against rotary displacement. The spacers A also have an internal transverse web $a$, perforated for the passage of a bolt $a'$, extending through the bottom disk $d^5$ and secured to the bottom ring $r$ by means of nuts or heads countersunk in said ring, as shown in Fig. 6. These bolts $a'$ also extend through a top-retaining disk $r'$ of less diameter than the bottom ring $r$ and overlapped by the top-retaining ring $d^3$, bolted to the centrifugal drum D, as hereinbefore stated, said bolts having at their upper end a ring $a^2$ for connection with a hoisting-tackle.

On the inner vertical face of the carriers C is arranged a feed-plate P, having as many outwardly-flaring feed-nozzles as there are tube-holders H, the feed-passages registering with said holders. Around each of these feed-nozzles $p$ is formed a circular recess $p'$, into which the inner open end of the tubes $t$ projects.

To the vertical inner face of each spacer A is bolted a lock-bar $b$, so constructed as to overlap adjacent feed-plates P, and thus lock the same and the carriers together into a ring on the bottom disk $d^5$, the bolt or bolts $b'$, that serve to lock said bars to the spacers, being screwed into the same from without and passing through suitable eyes $a^2$ of the vertical bolts $a'$. The heads of the bolts $b'$ lie in the vertical guide-groove in the outer wall of the spacers or in a suitable countersink, where this groove is absent, as there need not be a guide-rib for each of said spacers. In this manner the tube-holder carriers are locked against inward radial displacement, and the ring of such can be bodily lowered into and hoisted out of the drum D.

In practice and to protect the attendants from injury the centrifugal drum is inclosed in a shell or casing E, which is stationary, and may be bodily removable or have a removable cover $e$, provided with a feed-aperture $e'$, in register with a feed-funnel F, secured to the top plate $r'$ of the ring of carriers.

On the outer end of the carriers C is placed a backing-plate $g$ and outside of this a lock-plate $h$, wedge-shaped in vertical section, whose outer face is convex, the arc being a segment of the circle described by the inner periphery of the centrifugal drum D, both plates being supported by the bottom disk $d^5$.

The manipulation of the tube-carrier ring is as follows: Before the centrifugal drum is supplied with the material to be filled into tubes the ring of tube-carriers is hoisted out of the drum. To admit of this, the cover $e$ of said shell E is removed and then the retaining-plate $d^3$ from drum D, so that the ring of carriers C can be lifted out, whereby the lock-plates are loosened by the action thereon of the bottom disk $d^5$ of the ring-frame. Said lock-plates and the back plates are then removed, the tube-holders H withdrawn, tubes $t$ to be filled are inserted, and the holders returned to their carriers, with the inner open end of the tubes $t$ projecting over their respective feed-nozzles $p$. The backing-plates $g$ and lock-plates $h$ are then placed on the bottom disk $d^5$ of the ring-frame, and the latter is lowered into the drum D, being guided by the guide-ribs $d^4$ on its inner periphery, the lock-plates $h$ being finally driven home onto disk $d^5$, thus firmly locking the ring of carriers to the centrifugal drum D. The retaining-ring $d^3$ and cover $e$ are then replaced, material fed to the centrifugal drum, and the latter rotated, the tubes $t$ being filled by centrifugal action. After all the tubes $t$ are filled the rotation of drum D is arrested, the ring of carriers hoisted out of the same, as before described, and the plates $g$ and $h$ removed. When being hoisted out of the drum, all of the feed-nozzles $p$ will yet contain a small quantity of material in their inner tubular part, and if the tube-holders, with their tubes, were withdrawn from their carriers quite a considerable quantity of the material contained therein would be drawn out, if such material were more or less viscid. To avoid this, the tube H' is rotated, whereby all of the tube-holders are also rotated about their axes through their friction-sleeves, as hereinbefore described, thereby severing the material in tubes $t$ from the material in the nozzles $p$ and preventing its being drawn out into a string when the tube-holders are removed. The ring of carriers after being hoisted out of the centrifugal drum may be carried to any convenient part of the room, and as the carriers C can be readily withdrawn outwardly from between the spacers A carriers the holders of which contain tubes to be filled can be substituted for those removed.

In the drawings I have shown a ring of twelve carriers, each having bearings for twenty-four tube-holders. Hence in such a machine two hundred and eighty-eight tubes can be simultaneously filled; but I do of course not limit myself to this.

Having thus described my invention, what I claim as new therein, and desire to secure by Letters Patent, is—

1. In a machine such as described, the combination with a centrifugal drum, of a ring of interlocked carriers each carrying a multiplicity of open-ended tubular holders for the reception of tubes to be filled, a feed-nozzle at the inner end of each holder and means for removably locking said ring of carriers to the inner periphery of the drum, for the purposes set forth.

2. In a machine such as described, the combination with a centrifugal drum, of a ring of interlocked carriers each carrying a multiplicity of removable open-ended tubular holders for the reception of tubes to be filled, a feed-nozzle at the inner end of each holder and means for removably locking said ring of carriers to the inner periphery of the drum, for the purposes set forth.

3. In a machine such as described, the combination with a centrifugal drum, of a ring of carriers each provided with a multiplicity of bearings, a tubular open-ended holder for the reception of a tube to be filled, removable from and revoluble in each of said bearings, means for revolving the tube-holders, a feed-nozzle at the inner end of said holders and means for removably locking the said ring of carriers to the inner periphery of the drum, for the purposes set forth.

4. In a machine such as described, the combination with a centrifugal drum, of a ring of carriers each provided with a multiplicity of bearings, a tubular open-ended holder for the reception of a tube to be filled, removable from and revoluble in each of said bearings, means for simultaneously revolving the tube-holders, a feed-nozzle at the inner end of said holders, and means for removably locking the said ring of carriers to the inner periphery of the drum, for the purposes set forth.

5. In a machine such as described, the combination with a centrifugal drum, of a ring of interlocked carriers bodily removable from said drum, each carrier carrying a multiplicity of open-ended tubular holders for the reception of tubes to be filled, a feed-nozzle at the inner end of each tube, means for removably locking the ring of carriers to the inner periphery of the drum, and means for connecting the ring of carriers to a hoisting-tackle, for the purposes set forth.

6. In a machine such as described, the combination with a centrifugal drum, of a ring of interlocked carriers each carrying a multiplicity of open-ended removable tubular holders for the reception of tubes to be filled, a feed-nozzle at the inner end of each holder, said ring of carriers adapted to be bodily moved out of and into said drum, means for guiding the ring of carriers when so moved and locking it against rotary motion independently of the drum, and means for holding said ring of carriers against vertical displacement, for the purposes set forth.

7. In a machine such as described, the combination with a centrifugal drum, of a circular frame comprising a bottom plate and spacers radiating inwardly from the periphery thereof and dividing the same into rectangular spaces, a carrier for and fitting into each of said spaces and carrying a multiplicity of open-ended removable tubular holders for the reception of the tubes to be filled, a feed-nozzle at the inner end of each holder, means for locking the carriers against radial displacement, a top ring secured to the spacers and holding the carriers against vertical displacement, and means for locking the ring of carriers thus formed against rotary motion independently of the drum, for the purpose set forth.

8. In a machine such as described, the combination with a centrifugal drum, of a disk fitting into the drum, spacers radiating inwardly from the periphery of said disk and dividing the same into rectangular spaces, carriers fitting into said spaces and carrying each a multiplicity of removable open-ended tubular holders for the reception of tubes to be filled, a feed-plate on the inner face of each carrier, provided with a feed-nozzle for each of the holders, a locking-bar removably secured to the spacers and lapping over adjacent carriers, a top ring for holding the carriers against vertical displacement bolted to the spacers, the bolts provided with a ring at their upper end above the top ring, means removably locking the ring of carriers thus formed to the inner periphery of the drum, means for holding the carriers against outward radial movement and a retaining-ring for holding the ring of carriers against vertical motion in the drum, for the purposes set forth.

In testimony that I claim the foregoing as my invention I have signed my name in presence of two subscribing witnesses.

NORBERT CEIPEK.

Witnesses:
GUSTAV SHILIPPITSCH,
ALVESTO S. HOGUE.